United States Patent
Chirca et al.

(10) Patent No.: US 12,321,282 B2
(45) Date of Patent: Jun. 3, 2025

(54) SLOT/SUB-SLOT PREFETCH ARCHITECTURE FOR MULTIPLE MEMORY REQUESTORS

(71) Applicant: TEXAS INSTRUMENTS INCORPORATED, Dallas, TX (US)

(72) Inventors: Kai Chirca, Richardson, TX (US); Joseph R. M. Zbiciak, San Jose, CA (US); Matthew D. Pierson, Murphy, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/463,101

(22) Filed: Sep. 7, 2023

(65) Prior Publication Data
US 2023/0418759 A1    Dec. 28, 2023

Related U.S. Application Data (63) Continuation of application No. 17/384,864, filed on Jul. 26, 2021, now Pat. No. 11,789,872, which is a continuation of application No. 16/552,418, filed on Aug. 27, 2019, now Pat. No. 11,074,190, which is a continuation of application No. 15/899,138, filed on
(Continued)

(51) Int. Cl.
| G06F 3/06 | (2006.01) |
|---|---|
| G06F 12/0811 | (2016.01) |
| G06F 12/0862 | (2016.01) |
| G06F 12/0897 | (2016.01) |

(Continued)

(52) U.S. Cl.
CPC ...... *G06F 12/0897* (2013.01); *G06F 12/0811* (2013.01); *G06F 12/0862* (2013.01); *G06F 9/3802* (2013.01); *G06F 9/3806* (2013.01); *G06F 9/3844* (2013.01); *G06F 12/0886* (2013.01); *G06F 2212/602* (2013.01); *G06F 2212/6022* (2013.01); *G06F 2212/6028* (2013.01); *Y02D 10/00* (2018.01)

(58) Field of Classification Search
CPC ............. G06F 12/0897; G06F 12/0811; G06F 12/0862; G06F 12/0886; G06F 9/3802; G06F 9/3806; G06F 9/3844; G06F 2212/6022; G06F 2212/6028; Y02D 10/00
USPC ........................................................ 711/122
See application file for complete search history.

(56) References Cited

U.S. PATENT DOCUMENTS

| 5,345,560 A | 9/1994 | Miura et al. |
|---|---|---|
| 5,680,564 A | 10/1997 | Divivier et al. |

(Continued)

*Primary Examiner* — Than Nguyen
(74) *Attorney, Agent, or Firm* — Michael T. Gabrik; Frank D. Cimino (57) ABSTRACT

A prefetch unit includes multiple memories; and a memory controller coupled to the multiple memories. The memory controller includes a prefetch stream filter and a prefetch buffer. The prefetch stream filter includes a first set of address slots and a set of direction prediction fields, each of which is associated with a respective one of the address slots of the first set of address slots. The prefetch buffer includes a set of buffer slots, each slot of the set of buffer slots including an address field, a direction prediction field, a data pending field, a data valid field, and a set of sub-slots configured to store data, wherein each address field of each slot of the set of buffer slots is configured to store at least a portion of an address associated with the corresponding slot.

12 Claims, 5 Drawing Sheets

Related U.S. Application Data

Feb. 19, 2018, now Pat. No. 10,394,718, which is a continuation of application No. 13/233,443, filed on Sep. 15, 2011, now Pat. No. 9,898,415.

(60) Provisional application No. 61/387,367, filed on Sep. 28, 2010, provisional application No. 61/384,932, filed on Sep. 21, 2010.

(51) Int. Cl.
*G06F 9/38* (2018.01)
*G06F 12/0886* (2016.01)

(56) References Cited

U.S. PATENT DOCUMENTS

| | | |
|---|---|---|
| 5,761,706 A | 6/1998 | Kessler et al. |
| 5,784,076 A | 7/1998 | Crump et al. |
| 5,854,911 A | 12/1998 | Watkins |
| 5,926,841 A | 7/1999 | Novak et al. |
| 6,304,962 B1 * | 10/2001 | Nair ................... G06F 9/3806 711/212 |
| 6,449,698 B1 | 9/2002 | Deshpande et al. |
| 7,000,097 B2 | 2/2006 | Senter et al. |
| 9,898,415 B2 | 2/2018 | Chirca et al. |
| 2002/0133672 A1 | 9/2002 | Van De Waerdt et al. |
| 2003/0196044 A1 | 10/2003 | Ramirez et al. |
| 2007/0176939 A1 | 8/2007 | Sadowski |
| 2008/0120496 A1 * | 5/2008 | Bradford ............... G06F 9/384 712/E9.027 |
| 2008/0209173 A1 * | 8/2008 | Evers ............... G06F 12/0862 712/237 |
| 2009/0094435 A1 | 4/2009 | Lu |
| 2009/0198962 A1 * | 8/2009 | Levitan ............... G06F 9/384 712/205 |
| 2011/0145509 A1 | 6/2011 | Speight et al. |
| 2011/0264860 A1 | 10/2011 | Hooker et al. |

* cited by examiner

FIG. 6

SLOT/SUB-SLOT PREFETCH ARCHITECTURE FOR MULTIPLE MEMORY REQUESTORS

CLAIM OF PRIORITY

This application is a continuation of U.S. patent application Ser. No. 17/384,864, filed Jul. 26, 2021, which is a continuation of U.S. patent application Ser. No. 16/552,418, filed Aug. 27, 2019, now U.S. Pat. No. 11,074,190, which is a continuation of U.S. patent application Ser. No. 15/899,138, filed Feb. 19, 2018, now U.S. Pat. No. 10,394,718, which is a continuation of U.S. patent application Ser. No. 13/233,442, filed Sep. 15, 2011, now U.S. Pat. No. 9,898,415, which claims priority to U.S. Provisional Application No. 61/387,367, filed Sep. 28, 2010, and U.S. Provisional Application No. 61/384,932, filed Sep. 21, 2010, each of which is incorporated by reference herein in its entirety.

BACKGROUND

In computer architecture applications, processors often use caches and other memory local to the processor to access data during execution. The processors more efficiently execute instructions when, for example, data accessed by a processor is stored locally in a cache. Prefetchers are used to predictively access and store data in view of potential requests for data and/or program data stored in the memory. A prefetch unit (also known as a "prefetcher") prefetches and stores blocks of memory locally in a smaller, lower latency memory buffer using a replacement policy. The replacement policy governs which cache lines of data are to be discarded when new data arrives. If the discarded cache lines have been requested by the cache system but have not yet been sent to processor requesting the data, then new prefetches that are allocated to those locations are forced to stall (e.g., wait) until the data is returned to the cache to maintain cache coherency. The problem is compounded when multiple caches (often having differing line sizes and timing requirements) are used. Thus, an improvement in techniques for reducing stalls associated with generation of prefetch requests for a cache is desirable.

The problems noted above are solved in large part by a prefetch unit that prefetches cache lines for higher-level memory caches where each cache has a line size or width that differs from the line width of another local cache. The disclosed prefetch unit uses a slot/sub-slot architecture to service multiple memory requestors, such as a level-one (L1) and level-two (L2) cache, even when the caches have mutually different line sizes. Each slot of the prefetch unit is arranged to include sub-slots, where each sub-slot (for example) includes data and status bits for an upper and a lower half-line, where both half-lines are associated with a single tag address. Accordingly, the disclosed prefetch unit can prefetch memory for caches having mutually different line sizes, which provides a higher level of performance (such as reduced latencies and reduced space and power requirements).

As disclosed herein, a prefetch unit generates a prefetch address in response to an address associated with a memory read request received from the first or second cache. The prefetch unit includes a prefetch buffer that is arranged to store the prefetch address in an address buffer of a selected slot of the prefetch buffer, where each slot of the prefetch unit includes a buffer for storing a prefetch address, and two sub-slots. Each sub-slot includes a data buffer for storing data that is prefetched using the prefetch address stored in the slot, and one of the two sub-slots of the slot is selected in response to a portion of the generated prefetch address. Subsequent hits on the prefetcher result in returning prefetched data to the requestor in response to a subsequent memory read request received after the initial received memory read request.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used (throughout the following description and claims) to refer to particular system components. As one skilled in the art will appreciate, various names can be used to refer to a component. Accordingly, distinctions are not necessarily made herein between components that differ in name but not function. In the following discussion and in the claims, the terms "including" and "comprising" are used in an open-ended fashion, and thus are to be interpreted to mean "including, but not limited to . . . ." Also, the terms "coupled to" or "couples with" (and the like) are intended to describe either an indirect or direct electrical connection. Thus, if a first device couples to a second device, that connection can be through a direct electrical connection, or through an indirect electrical connection via other devices and connections. As used herein, a single device that is coupled to a bus (which includes one or more signals) can represent all instances of the devices that are coupled to each signal of the bus.

Figure 1:
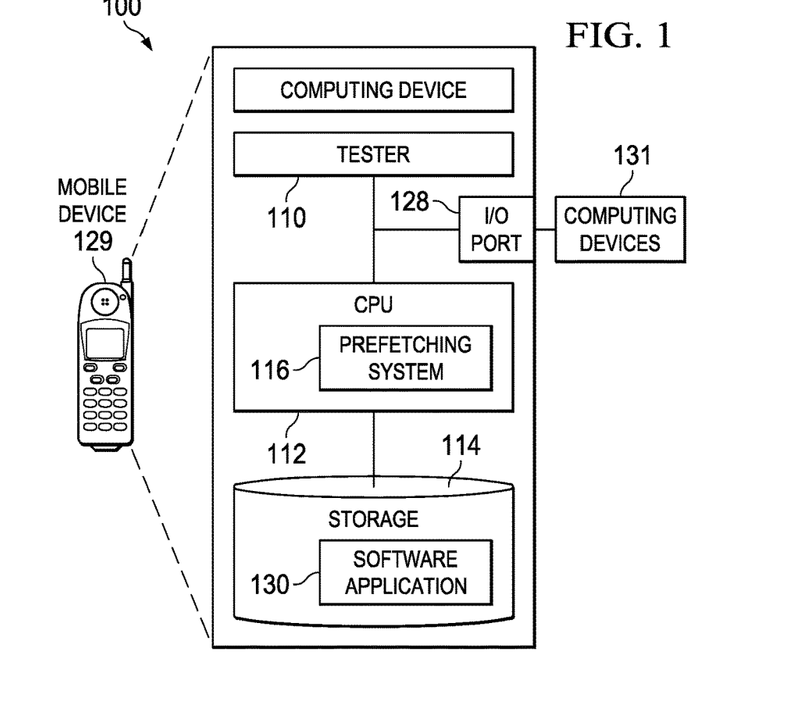
FIG. 1 depicts an illustrative computing device 100 in accordance with embodiments of the disclosure.

FIG. 1 depicts an illustrative computing device 100 in accordance with embodiments of the disclosure. The computing device 100 is, or is incorporated into, a mobile communication device 129 (such as a mobile phone or a personal digital assistant such as a BLACKBERRY® device), a personal computer, automotive electronics, or any other type of electronic system.

In some embodiments, the computing device 100 comprises a megacell or a system-on-chip (SoC) which includes control logic such as a CPU 112 (Central Processing Unit), a storage 114 (e.g., random access memory (RAM)) and tester 110. The CPU 112 can be, for example, a CISC-type (Complex Instruction Set Computer) CPU, RISC-type CPU (Reduced Instruction Set Computer), or a digital signal processor (DSP). The storage 114 (which can be memory such as RAM, flash memory, or disk storage) stores one or more software applications 130 (e.g., embedded applications) that, when executed by the CPU 112, perform any suitable function associated with the computing device 100. The tester 110 comprises logic that supports testing and debugging of the computing device 100 executing the software application 130. For example, the tester 110 can be used to emulate a defective or unavailable component(s) of the computing device 100 to allow verification of how the component(s), were it actually present on the computing device 100, would perform in various situations (e.g., how the component(s) would interact with the software application 130). I/O port 128 enables data from tester 110 to be transferred to computing devices 131. In this way, the software application 130 can be debugged in an environment which resembles post-production operation.

The CPU 112 typically comprises memory and logic which store information frequently accessed from the storage 114. Various subsystems (such as the CPU 112 and/or the storage 114) of the computing device 100 include one or more prefetching systems 116, which are used to perform memory prefetch operations during the execution of the software application 130.

Prefetching systems 116 track memory requests from one or more streams using "slots" to maintain pointers to memory addresses used to prefetch data for each stream. Conventional prefetching systems stall prefetch generation for a slot until all the data stored in the slot is sent to the cache. However, delaying prefetches reduces the amount of latency a prefetch unit is able to provide, which adversely affects hurts performance. Increasing the number of slots and associated hardware of the prefetch unit helps to reduce the number of times prefetch generation is stalled. However, this approach involves larger area and power costs due to extra the hardware and added address comparators for hit checks for all of the slots.

Disclosed herein are techniques for reducing hardware latency associated with prefetch buffer memory accesses. The disclosed techniques reduce hardware latency by arranging a prefetch unit to service caches of differing function and sizes. For example, variable line size prefetching is performed for various caches such as a level-one data (L1D) cache and/or a level-one program cache (L1P) and a level-two (L2) cache, wherein the caches from different levels (and/or caches from the same level) have differing operating parameters such as line sizes and/or request type width (such as 32-bit word or a 64-bit word widths).

Figure 2:
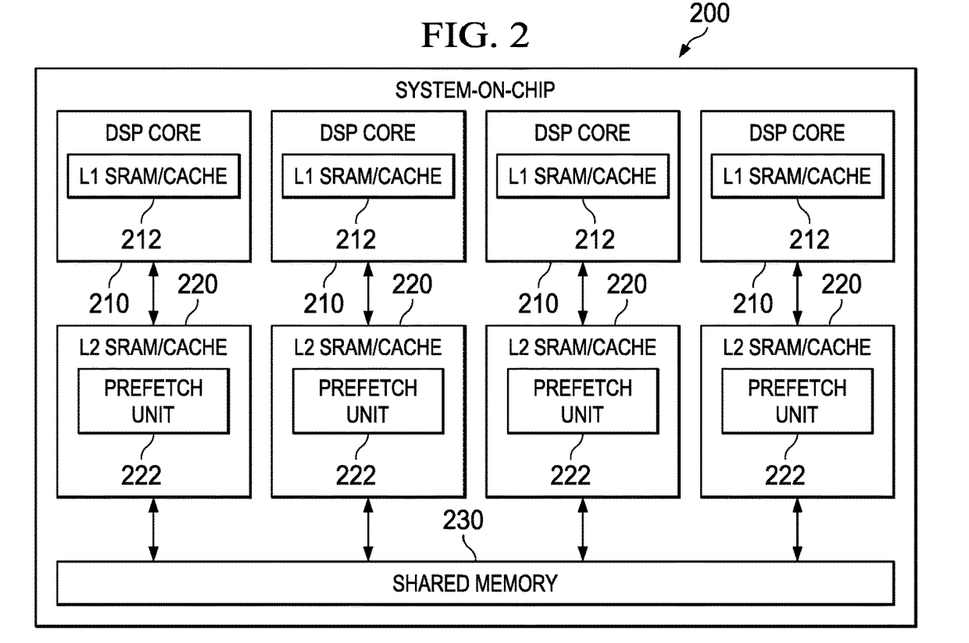
FIG. 2 is a block diagram illustrating a computing system including a prefetch unit in accordance with embodiments of the disclosure.

FIG. 2 is a block diagram illustrating a computing system including a prefetch unit in accordance with embodiments of the disclosure. Computing device 100 is illustrated as an SoC 200 that includes one or more DSP cores 210, SRAM/Caches 220, and shared memory 230. Although the illustrated elements of the computing system 200 are formed using a common substrate, the elements can also be implemented in separate substrates, circuit boards, and packages (including the shared memory 230).

Each DSP core 210 optionally includes a level-one data cache such as L1 SRAM/Cache 212. Each DSP core 210 optionally is connected to a level-two cache such as L2 SRAM/Cache 220. Each L2 SRAM/Cache 220 optionally includes a prefetch unit 222 for prefetching data to provide relatively quick access to read and write memory. Additionally, each DSP core 210 is coupled to a shared memory 230, which usually provides slower (and typically less expensive) memory accesses than L1 SRAM Cache 212 or L2 SRAM/Cache 220. The shared memory 230 stores program and data information that can be shared between each DSP core 210.

In various embodiments, the prefetch unit 222 is a program prefetcher that allocates an available slot to a program accesses and provides a dynamically sized buffer for storing information in slots and/or sub-slots to accommodate differing line sizes and request types from differing streams.

Figure 3:
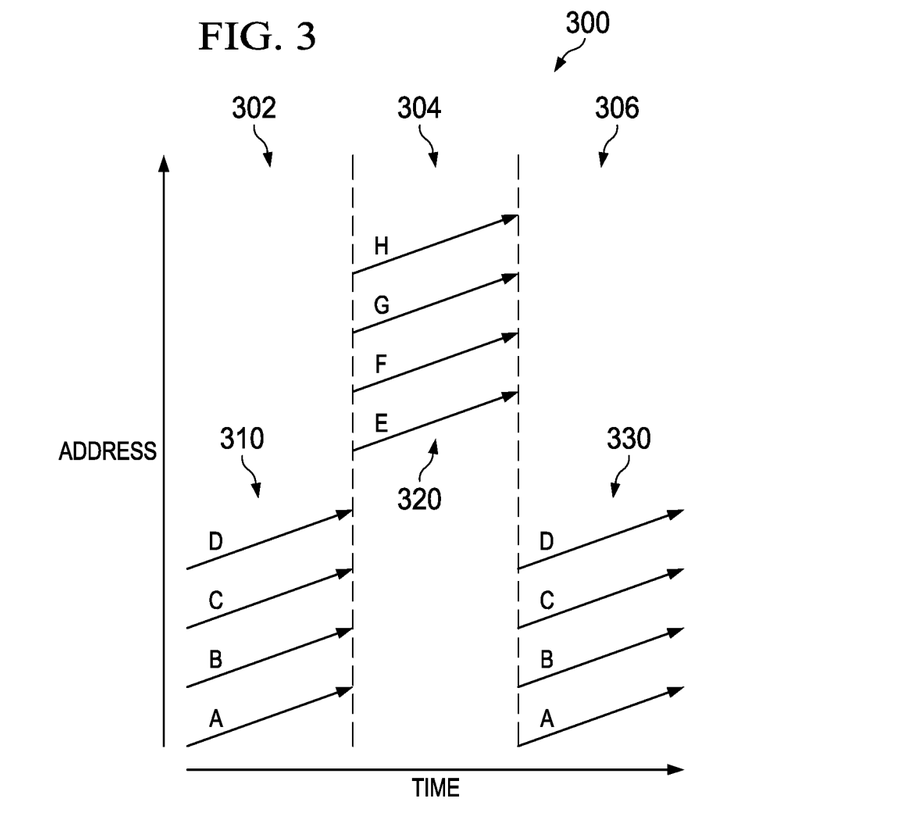
FIG. 3 is a timing diagram illustrating multi-stream memory accesses over time.

FIG. 3 is a timing diagram illustrating multi-stream memory accesses over time. Plot 300 vertically represents increasing memory addresses and horizontally represents memory accesses of data over time. The time continuum illustrated horizontally is divided into three periods (302, 304, and 306) that represent periods in time in which an execution of a program is, for example, evaluating different equations. In period 302, a program executing a programming loop statement [1] such as (in "c" language):

$$\text{for } (i=0; i<n; i++)\{d[i]=a[i]+b[i]+c[i]\} \quad [1]$$

performs memory accesses that, when plotted, produces traces (designated generally) 310. Each reference to an element of arrays "a," "b," "c," and "d" respectively produces a trace that, over time, progresses higher in address space. Thus, each trace of traces 310 is an illustration of a stream.

When variable "i" reaches terminal count "n," the program execution proceeds to period 304, where (for example) traces 320 are formed when another loop statement is executed. Likewise, traces 330 are formed when program execution proceeds into period 306 and re-executes programming loop statement [1]. Thus, each trace of the traces 320 and 330 is an illustration of a stream, and the plot 300 generally illustrates multi-stream memory accesses.

Figure 4:
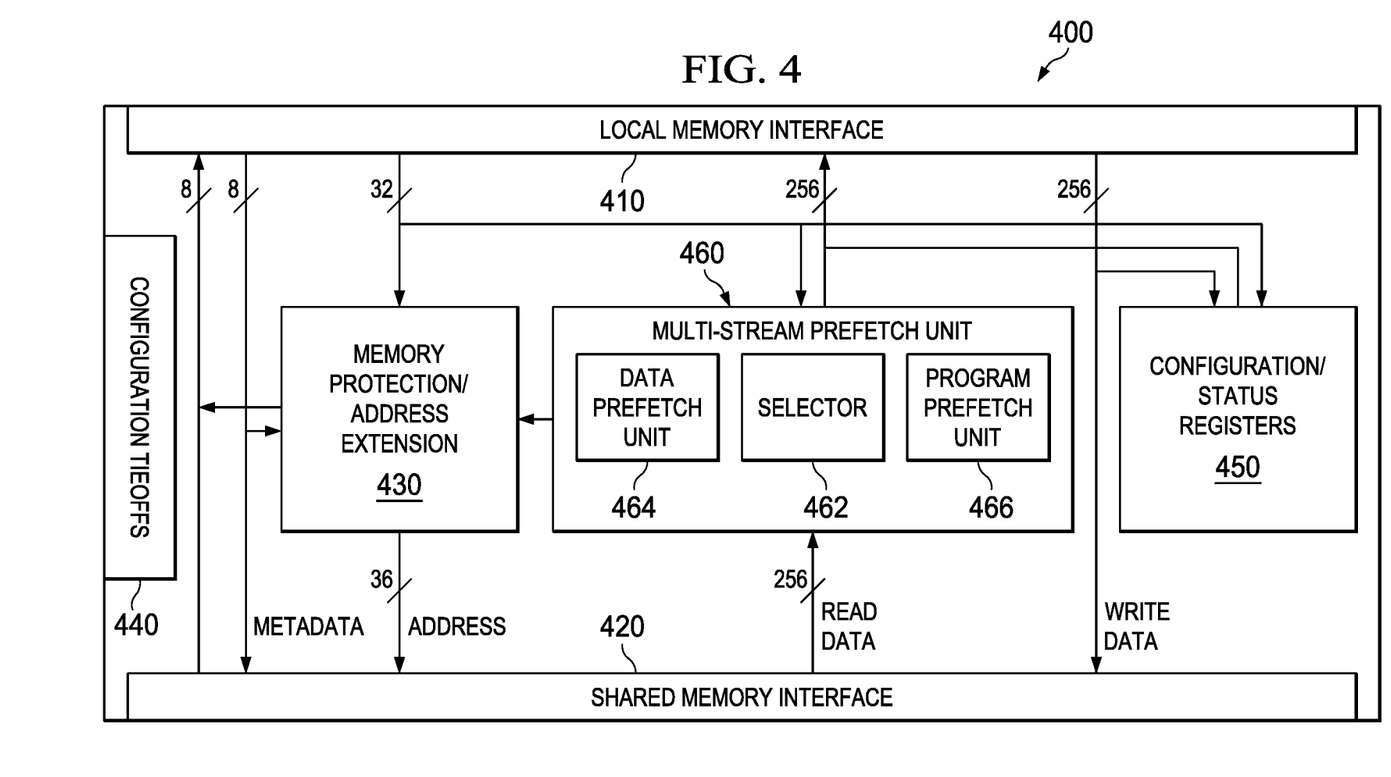
FIG. 4 is a block diagram illustrating a memory controller that includes a multi-stream prefetch unit in accordance with embodiments of the present disclosure.

FIG. 4 is a block diagram illustrating a memory controller that includes a multi-stream prefetch unit in accordance with embodiments of the present disclosure. Memory controller 400 includes a local memory interface 410. The local memory interface 410 provides an interface and protocol system to handle memory requests for a local memory controller such as L2 SRAM/Cache 220. In addition to providing address, read data, and write data signals, the local memory interface 410 provides information concerning prefetchability, cacheability, and an indication of half-line L2 (e.g., cache "level two") line allocation in metadata signals. The local memory interface 410 signals include information concerning command signals detailing a request, elevating the priority of a request, indicating a data versus instruction (e.g., program data) fetch, indicating whether a request is "cacheable in L2" cache, indicating a cache line size of request, and indicating a privilege/secure level of the request.

Memory controller 400 includes a shared memory interface 420. The shared memory interface 420 provides an interface and protocol system to handle memory requests for a shared memory such as shared memory 230. The shared memory interface 420 also provides additional metadata to shared memory and/or external slaves. The metadata provides information such as memory segmentation endpoints, physical addresses within sections of segmented memory, cacheability of requests, deferred privilege checking, request for access type (data, instruction or prefetch), and request priority and elevated priority.

Memory controller 400 includes a unit for memory protection/address extension 430. The unit for memory protection/address extension 430 performs address range lookups, memory protection checks, and address extensions by combining memory protection and address extension into a single, unified process. The memory protection checks determine what types of accesses are permitted on various address ranges within the memory controller 400's 32-bit logical address map. The address extension step projects those accesses onto a larger 36-bit physical address space.

Memory controller 400 can be controlled and configured using configuration tieoffs 440 and configuration/status registers 450. Configuration tieoffs 440, for example, can be set during the manufacturing process to configure operation of the memory controller 400 for a specific system. Configuration/status registers 450, for example, can be set during operation to configure and control operation of the memory controller 400 by reading status indications and providing commands.

Memory controller 400 includes a multi-stream prefetch unit 460. The multi-stream prefetch unit 460 includes a selector 462 that chooses a prefetch unit based upon the type of memory request that is received. When, for example, a data memory request from a level-one or a level-two data cache is received, the selector 462 enables data prefetch unit 464 to handle potential prefetches for the received data memory request. The data prefetch unit 464 is discussed below with respect to FIG. 5.

Figure 5:
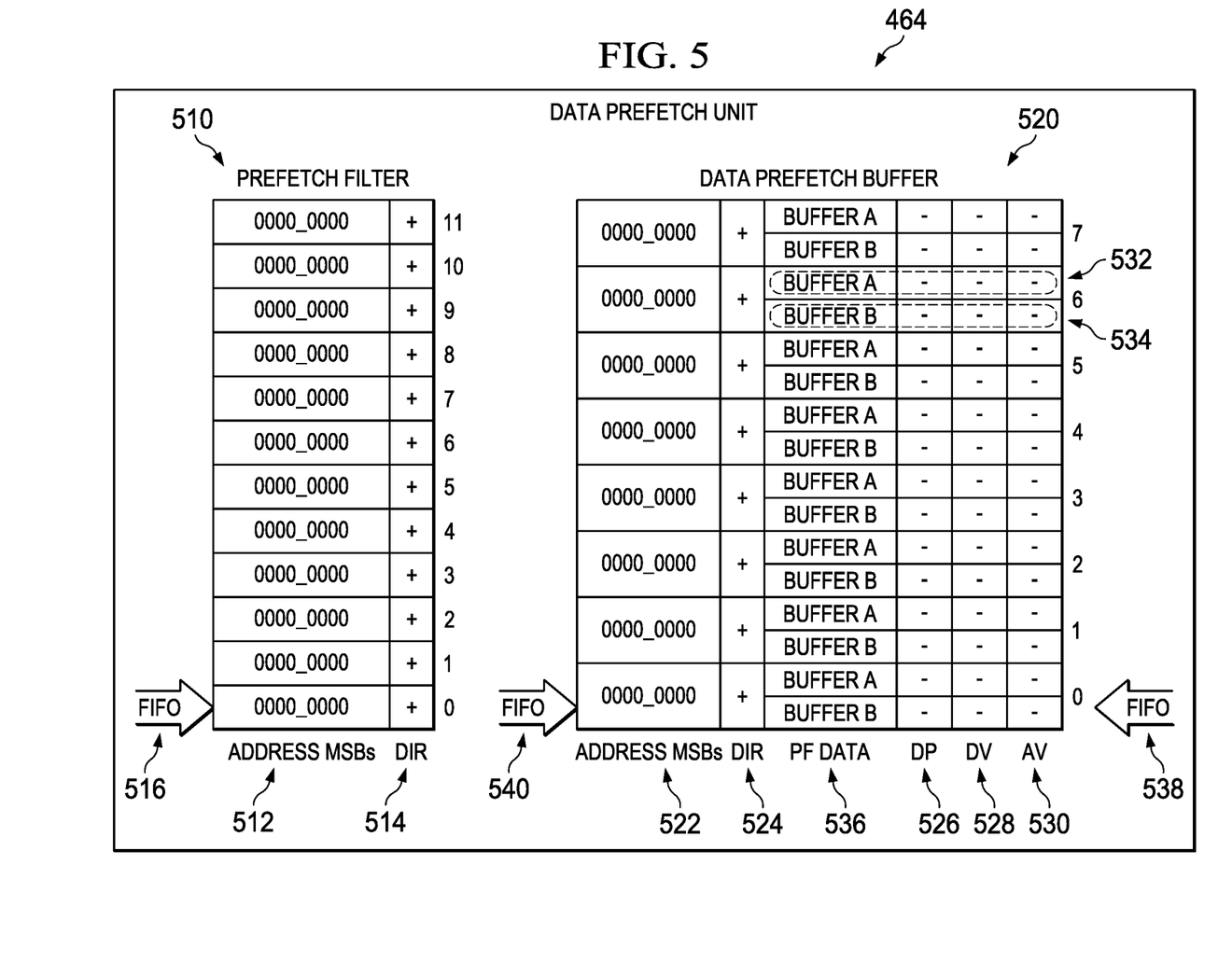
FIG. 5 is a block diagram illustrating a data prefetch unit in accordance with embodiments of the present disclosure.

FIG. 5 is a block diagram illustrating a data prefetch unit in accordance with embodiments of the present disclosure. Data prefetch unit 464 typically includes a prefetch filter 510 (which is used for identification of streams) and a data prefetch buffer 520 (which is used to prefetch data for streams having assigned slots).

Prefetch filter 510 is a stream detection filter that includes a 12-address candidate buffer. Each slot of prefetch filter 510 stores one of up to 12 potential stream "head" (e.g., starting) addresses as logical addresses, along with a single bit (field 514) to indicate the predicted stream direction associated with that slot. Prefetch filter 510 uses a FIFO allocation order to assign a candidate stream to a slot, which is determined by a simple FIFO counter 516 (various numbering systems, such as Gray code, can be used). Each new allocation of a candidate stream in the prefetch filter 510 uses the next slot number indicated by the FIFO counter 516. For example, allocation in the prefetch filter 510 proceeds, starting at slot #0, counting to slot #11, and then wrapping back to slot #0 when all 12 slots have been previously allocated.

Each candidate field 512 is initialized with zeros and is used to store a significant portion (e.g., most significant bits or portion) of an address of a memory access of a potential stream. Likewise, each direction field (DIR) 514 is initialized with a bit set to indicate a positive (or, alternatively, a negative) direction that is used to determine a successive prefetch address. A particular direction field 514 can be set by comparing the next memory request of a stream with the address of the stream head (or an incremented stream head).

For example, a demand request (a memory request that originates from the program processor) is received. An address of the demand request is compared with each of the candidate field 512 values, and if none match, the demand request is passed to shared memory, and the address of the demand request is modified (e.g., incremented or decremented in accordance with the direction field 514) and placed in the candidate field 512 that is pointed to by FIFO counter 516 (which in turn is incremented or wrapped around to zero at a terminal count). When a subsequent demand request is received and matches one of the candidate field 512 values (a "hit"), the value of the candidate field 512 (or a modified value thereof) is entered into the data prefetch buffer 520 (and the hit is "qualified" as discussed below), and the candidate field 512 is reset (e.g., erased or invalidated). If the subsequent demand request that is received matches one of the candidate fields 512 by a value modified (e.g., decremented or incremented) twice, the direction field is inverted and the value of the candidate field is transferred (as discussed below). In the event of a qualified hit, the direction field 514 value is transferred to the direction field 524 of the data prefetch buffer 520.

Thus, candidate field 512 entries in the prefetch filter 510 have the potential to become prefetch streams. The detection filter first determines whether memory accesses meet criteria such as whether the memory access is prefetchable, whether the memory access is a cache line fill for data, whether the memory access is an L1D (level-1 data cache) access, whether the memory access is a non-critical half of an L2 line (level-2 cache) line access, and whether the memory access is not already present in the prefetch buffer.

The memory accesses meeting the preceding qualifications are then compared against the existing entries of potential streams in the various slots of the prefetch filter 510. L1D requests are compared at 64-byte granularity, whereas L2 requests are compared at 128-byte granularity. Whether a stream associated with a memory access is entered in to a slot is determined by whether the memory access matches an entry in the prefetch filter 510.

If the memory access does not match an existing entry (a "miss"), the prefetch filter 510 allocates a new filter slot and places the predicted next address and predicted stream direction in the newly allocated slot (selected by FIFO counter 516). The prefetch filter 510 does not always protect against redundant entries, which normally only occur when thrashing the cache, and are thus relatively rare occurrences. Table 1 illustrates the logic for how a direction of a stream is predicted on the basis of the origin of the memory access (request), the requested address, and the predicted address.

TABLE 1

| Requestor | Requested Address | Predicted Address | Predicted Direction |
|---|---|---|---|
| L1D | Bit 6 = 0 | Requested address + 64 | Increasing address |
| L1D | Bit 6 = 1 | Requested address − 64 | Decreasing address |
| L2 | Bit 7 = 0 | Requested address + 128 | Increasing address |
| L2 | Bit 7 = 1 | Requested address − 128 | Decreasing address |

If the memory access request does match an existing entry in a slot of the prefetch filter 510, the prefetch filter 510 allocates a new stream slot for the stream. The new stream slot is allocated by initializing its address to the next address in that stream according to the direction bit stored with that slot. After allocating the new stream slot, prefetches are initiated for the new stream slot. Thus, all new streams are initiated by having addresses that (over time) cross a 128-byte (L1D stream) or 256-byte (L2 stream) boundary. Thus, the first two fetches for each L1D stream (being half the size of L2 streams) normally correspond to the two half-slots of a single slot.

Data prefetch unit 464 includes the data prefetch buffer 520, which is used to prefetch data for streams having assigned slots. In an embodiment, data prefetch unit 464 is a dual "sub-slot" prefetch engine for servicing direct L1D requests and L2 program fetches. The data prefetch unit 464 uses an extended memory prefetch scheme, extended to the full address space in shared memory. The data prefetch unit 464 handles cacheable, prefetchable data fetches as candidates for prefetching.

The data prefetch buffer 520 of data prefetch unit 464 holds eight logical slots, each of which is associated with storage for two 64-byte data fetches such as buffer A and B of PF (prefetch) data 536. Using two sub-slots (such as buffer A and B) provides handling of memory requests for two levels of cache that operate on different cache line widths and have different request characteristics. The two sub-slots use the entire prefetch buffer space with both requestors (e.g., a first-level cache and a second-level cache) and stay within frequency and power goals.

The data prefetch unit 464 can also allocate a sub-slot for prefetching data for a first cache that has a cache line width that is the same buffer width as an individual buffer of a sub-slot. For example, a buffer width of 64 bytes can be used to store prefetched lines of data for a first-level cache, which also has a cache line width of 64 bytes. Each sub-slot of a slot is used to store cache lines from contiguous addresses. Thus, a single (e.g., fully associative) address tag can be used to tag the prefetched data in both sub-slots of a slot. An address bit of an order that is one less than the least significant bit stored in the data buffer 522 is used to select between buffer A and buffer B of a given slot.

However, data prefetch unit 464 can allocate a both buffers of a slot for prefetching data for a second cache that has a cache line width that is the same as the combined buffer width (e.g., both buffer A and B). For example, a buffer width of 128 bytes can be used to store prefetched lines of data for a second-level cache, which also has a cache line width of 128 bytes.

A request width for a data access can be used to adapt the width of transferred data to accommodate a stored buffer size. For example, a request from the level-two cache (which has a 128-byte line width) can use a request type width of 64-bytes wide to accommodate the width of the prefetch buffer. The two half-lines of 64-bytes each can be sent in tandem (one after the other) to fulfill the memory request for a cache line of 128 bytes.

Accordingly, a hit (e.g., where a memory request is received that matches an address tag stored in the address MSBs 522 buffer) by either requestor (e.g., the first or second cache) can be serviced by any of the slots of the data buffer 520). All of the PF data 536 buffers can be fully utilized because (for example) a prefetch for a neighbor (for a contiguous address) sub-slot is generated in tandem with a prefetch for a first sub-slot. The full utilization of the data prefetch buffer 520 maintains frequency and power operational constraints is thus similar to the requirements of a conventional prefetcher (having a comparable number of slots) for a single cache. FIFO counter 538 is to point to the predicted next prefetch hit by a memory request (to preselect the output of a slot, so that either or both of the sub-slots can be quickly accessed if the next memory request is successfully predicted.

Each of the eight slots has at least one address field 522, a direction field (DIR) 524, a data pending (DP) field 526, a data valid (DV) field 528, and an address valid (AV) field 530. Address field 522 stores upper bits of a logical address associated with the associated slot. Data pending (DP) field 526 is used to indicate whether a prefetch is outstanding the associated slot. Data valid (DV) field 528 is used to indicate whether the program data in the associated slot is valid. The data prefetch unit 464 does not necessarily keep a separate "address valid" bit for each stream. Instead, the data prefetch unit 464 launches prefetch requests for any slot that has data pending or data valid bit that is set to be valid. Thus, a demand fetch would normally only "hit" slots for which DP is pending or DV is valid.

A data pending (DP) field 526, a data valid (DV) field 528, and an address valid (AV) field 530 is used for each sub-slot (or "half-slot"). Thus (for example), group 532 illustrates a sub-slot that includes a data pending (DP) field 526, a data valid (DV) field 528, and an address valid (AV) field 530 for a first half-slot of a slot, and group 534 illustrates a sub-slot that includes a data pending (DP) field 526, a data valid (DV) field 528, an address valid (AV) field 530 for a second half-slot of the slot.

The data prefetch unit 464 allocates slots using a FIFO ordering system (such described above with respect to the prefetch filter 510). For example, slot #0 is allocated first (by using FIFO counter 540 to point to slot #0), followed by slot #1, #2 and #3, and so on until the last slot (such as slot #7) before wrapping back to slot #0. Each slot is associated with two 32-byte data buffers that are structured respectively as a first and second portion of a double-buffer.

In operating scenarios where a less than a full number of streams is encountered (e.g., streams for which a slot can be assigned without having to reassign a slot from an active stream), the efficiency of the prefetch data buffer can approach the performance of a fully associated cache for handling the encountered streams. For example, the address in the address buffer can be incremented or decremented (in accordance with the direction field 524) and additional data prefetched by the data prefetch unit 464 using the new address buffer value to provide the subsequent data requested by a stream. Allocation of slots by FIFO 540 is further described below with reference to FIG. 6.

Figure 6:
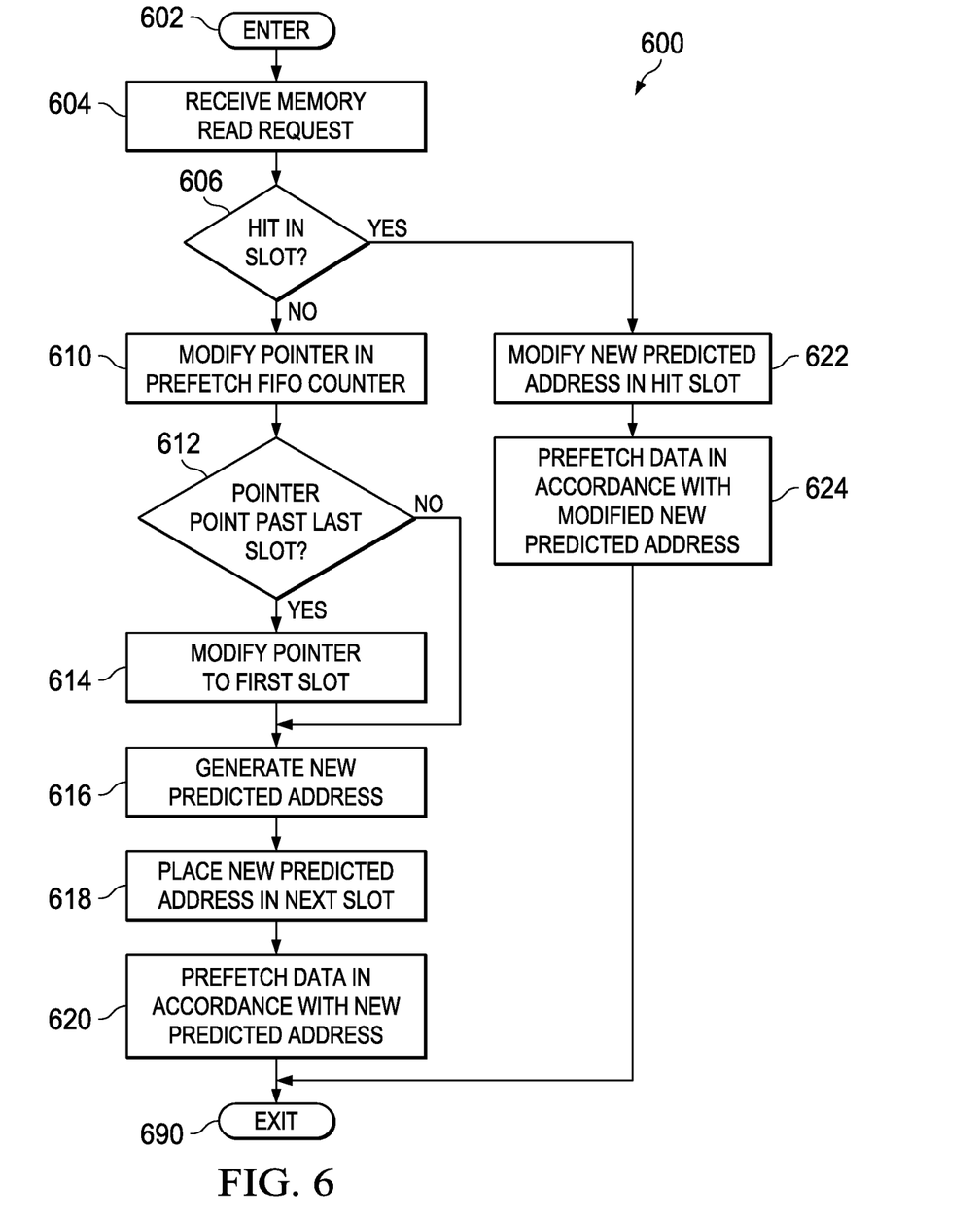
FIG. 6 is a process diagram illustrating a variable line size prefetching in accordance with embodiments of the present disclosure.

FIG. 6 is a process diagram illustrating a multi-stream prefetch process in accordance with embodiments of the present disclosure. Process 600 is entered at node 602 and proceeds to function 604. At function 604, a memory read request is received from a higher-level, local memory (which typically includes a first-level data cache and a second-level data and program cache). In function 606, it is determined whether an address that is associated with the received memory request is present (or "hit") in a slot of an array for storing predicted addresses used for prefetching. If the slot is hit, the process flow continues to function 622, or if not, the process flow continues to function 610.

In function 610, the value (which is used as a pointer) of a prefetch FIFO counter (such as FIFO counter 540) is modified to point to a new slot. In various embodiments the modification can be, for example, a pre- or post-increment function. In function 612, it is determined whether the pointer points past a last slot of the array for storing predicted addresses used for prefetching. If the pointer points past a last slot, the process flow continues to function 614, or if not, the process flow continues to function 616. In function 614, the pointer is modified to point to the first slot and the process flow continues to function 616. In an embodiment, a modulo counter having a terminal value equal to the number of available slots of the array is used.

In function 616, a new predicted address is generated in accordance with the address associated with the received memory request. In various embodiments, the new predicted address is generated by incrementing or decrementing (e.g., in accordance with a direction field) the most significant bits of the address associated with the received memory request. In function 618, the new predicted address is placed in a next slot, pointed to by the pointer. In function 620, data from a lower-level memory is prefetched using the new predicted address stored in the next slot. (In alternate embodiments, functions 616, 618, and 620 can be implemented by modifying the new predicted address after retrieving from the next slot and the modified new predicted address used to perform a memory prefetch.) After the data from a lower-level memory is prefetched, the process flow continues to node 690, where the process flow exits.

In function 622, a modified new predicted address is generated using a value stored in the hit slot. In various embodiments, the new predicted address is generated by incrementing or decrementing the most significant bits of the stored value, which is returned to the hit (e.g., same) slot. In function 624, data from a lower-level memory is prefetched using the modified new predicted address stored in the next slot. (In alternate embodiments, functions 622, and 624 can be implemented by modifying the new predicted address after retrieving from the hit slot and the modified new predicted address used to perform a memory prefetch.) After the data from a lower-level memory is prefetched, the process flow continues to node 690, where the process flow exits.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A device comprising:
multiple memories; and
a memory controller coupled to the multiple memories, the memory controller including:
   a prefetch stream filter that includes a first set of address slots and a set of direction prediction fields, each of which is associated with a respective one of the address slots of the first set of address slots; and
   a prefetch buffer that includes a set of buffer slots, each slot of the set of buffer slots including an address field, a direction prediction field, a data pending field, a data valid field, and a set of sub-slots configured to store data, wherein each address field of each slot of the set of buffer slots is configured to store at least a portion of an address associated with the corresponding slot.

2. The device of claim 1, wherein the memory controller includes a multi-stream prefetch unit that includes the prefetch stream filter and the prefetch buffer.

3. The device of claim 1, wherein one of the multiple memories is a first cache memory and another of the multiple memories is a second cache memory.

4. The device of claim 3, further comprising a processor, wherein each of the first cache memory and the second cache memory is coupled between the processor and the memory controller.

5. The device of claim 4, wherein the memory controller is configured to:
   receive a first request for data;
   determine that the first request is a miss in the prefetch stream filter;
   determine a first predicted stream direction for the first request;
   determine a predicted next address for the first request based on the first predicted stream direction; and
   store the predicted next address for the first request in the prefetch stream filter.

6. The device of claim 5, wherein the memory controller is configured to:
   receive a second request for data;
   determine that the second request is a hit in the prefetch stream filter;
   determine a predicted next address for the second request based on a second predicted stream direction for the second request;
   store the predicted next address for the second request in the prefetch buffer; and
provide a set of prefetch requests based on the predicted next address for the second request.

7. The device of claim 5, wherein the memory controller is configured to determine the first predicted stream direction based on an address associated with the first request.

8. The device of claim 3, wherein the first cache memory is a level one data cache memory having a first line width, and the second cache memory is a level two data cache memory having a second line width that is different from the first line width.

9. The device of claim 8, wherein the second line width is twice that of the first line width.

10. The device of claim 1, wherein the prefetch stream filter is structured as a first-in-first-out buffer.

11. The device of claim 10, wherein the prefetch buffer is structured as a first-in-first-out buffer.

12. The device of claim 6, wherein the memory controller is configured to provide the first request and the second request to one of the multiple memories.

* * * * *